United States Patent
Kumar et al.

(10) Patent No.: US 12,517,658 B2
(45) Date of Patent: Jan. 6, 2026

(54) RISING EDGE DETECTION OF A CLOSING CYCLE FOR A MULTI-CYCLE OPERATION

(71) Applicant: Arm Limited, Cambridge (GB)

(72) Inventors: Akshay Kumar, New Delhi (IN); Edward Martin McCombs, Jr., Austin, TX (US)

(73) Assignee: ARM LIMITED, Cambridge (GB)

( * ) Notice: Subject to any disclaimer, the term of this patent is extended or adjusted under 35 U.S.C. 154(b) by 58 days.

(21) Appl. No.: 18/436,379

(22) Filed: Feb. 8, 2024

(65) Prior Publication Data

US 2025/0258609 A1   Aug. 14, 2025

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
USPC ........................................... 365/196
See application file for complete search history.

(56) References Cited

U.S. PATENT DOCUMENTS

| | | | |
|---|---|---|---|
| 6,606,360 B1* | 8/2003 | Dunning | H04L 7/0338 375/354 |
| 7,054,374 B1* | 5/2006 | Jensen | H04L 5/1423 375/220 |
| 2020/0034686 A1* | 1/2020 | Chiu | G06N 3/065 |
| 2020/0035305 A1* | 1/2020 | Choi | G11C 11/54 |
| 2023/0296364 A1* | 9/2023 | Teowee | F42D 1/055 102/215 |

* cited by examiner

*Primary Examiner* — Ly D Pham
(74) *Attorney, Agent, or Firm* — Talem IP Law, LLP

(57) ABSTRACT

Control circuitry for memory includes a state machine including a number of state elements corresponding to a maximum number of available columns of a blast operation for memory; a set of registers including a corresponding register for each state element; and a last cycle detection circuit structured to combine outputs of the set of registers with the outputs of the state machine to generate a last cycle signal that goes high on a rising edge of a closing clock of a multi-cycle operation. The state machine receives a clock and various inputs associated with a start of memory operations and provides intermediate state element outputs and a final state element output as the outputs. Each register of the set of registers is available to store, from an address enable signal, a value indicating that a column in memory to which that register corresponds is to be accessed.

20 Claims, 8 Drawing Sheets

RISING EDGE DETECTION OF A CLOSING CYCLE FOR A MULTI-CYCLE OPERATION

BACKGROUND

Random Access Memory (RAM) is a type of volatile memory typically used as the main or primary memory for a processing unit and stores the programs and data that the processing unit is using during execution of a program. Static Random Access Memory (SRAM) is typically the type of memory used for caches. SRAM is generally configured as an array, or matrix, of memory units that are individually addressable. Read and write operations are performed on units of data referred to as words. That is, a word refers to a unit of data used by a particular processor design or instruction set.

In general, wordlines are used to select a row for reading or writing and bitlines carry data to/from a column. For the read operation in SRAM, the address of a storage location for a word is transferred to an address line, a pre-charge circuit is used to bring bitlines to VDD, the wordline is driven high (pre-charge circuit is turned off), the cells storing the data at the storage location pull down one bitline, and a sense circuit on a periphery of the array is activated to capture the value on the bitlines. For the write operation in SRAM, the address of a desired word is transferred to a specific address on the wordline and column, data bits to be stored in the memory are transferred to the bitlines, which are driven by a column driver circuit, and the write control is activated to drive the wordline high (while the column driver stays on) and drive the data into the cells being written.

The speed of a processing unit is determined by how many calculations a processor can perform per clock cycle. However, one limiting factor to the performance of a processing unit is the speed at which the data stored in memory can be read and written. Row and column changes, changing between commands, and other operations can contribute to higher latencies. Identifying mechanisms to reduce the number of clock cycles to deliver data (both to memory as a write operation and to a processing unit as a read operation) continues to be important for performance.

BRIEF SUMMARY

Circuitry to detect a rising edge of a closing cycle for multi-cycle operations such as increased throughput read and write operations for memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in increased throughput.

Control circuitry for increased throughput read and write operations includes a state machine with a number of state elements corresponding to a maximum number of available columns of the blast operation, wherein the state machine is structured to receive a clock and an input associated with a start of memory operations and provide intermediate state element outputs and a final state element output; a set of registers including a corresponding register for each state element such that the set of registers has a number of registers corresponding to the maximum number of available columns of the blast operation, wherein each register of the set of registers is available to store, from an address enable signal, a value indicating that a column in memory to which that register corresponds is to be accessed; and a last cycle detection circuit structured to combine outputs of the set of registers with the outputs of the state machine to generate a last cycle signal that goes high on the rising edge of a closing clock of a multi-cycle operation.

A memory circuitry including the above control circuitry can further include a wordline driver for a memory, the wordline driver coupled to receive an address and select a corresponding wordline for the memory; and input/output circuitry comprising read circuitry and write circuitry. The above described control circuitry can operate the wordline driver and the input/output circuitry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Circuitry to detect a rising edge of a closing cycle for multi-cycle operations such as increased throughput read and write operations for memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in increased throughput.

Figure 1:
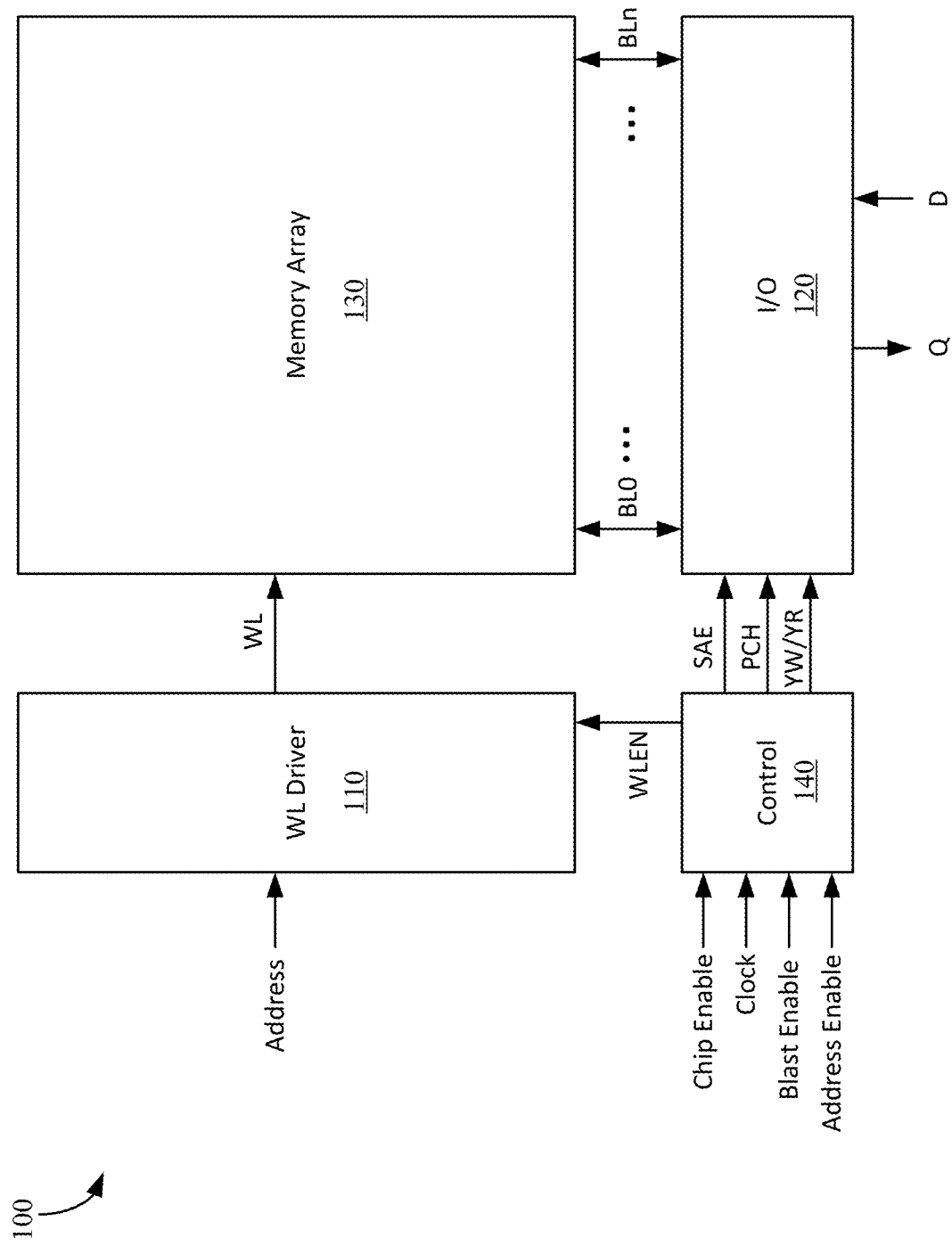
FIG. 1 shows a representational diagram of a memory circuitry.

FIG. 1 shows a representational diagram of a memory circuitry.

Referring to FIG. 1, memory circuitry 100 includes a wordline (WL) driver 110 and input/output circuitry 120 for a memory array 130. The WL driver 110 and the input/output circuitry 120 operate under the control of a control circuit 140. In some implementations, the memory circuitry 100 is cache circuitry.

The memory 130 is structured in an array with rows accessed by wordlines and columns accessed by bitlines. In certain implementations, the memory 130 is a static random access memory (SRAM). The structure of each bitcell of the memory can be 1:1:1 bitcells, 1:1:2 bitcells, or 1:2:2 bitcells, as examples. The bitcells may be implemented in FinFET processes, planar processes, nanosheet processes, FDSOI processes, or other suitable technologies. A bitcell refers to the memory element storing a single bit of information.

The control circuit 140 can receive a chip enable signal, a clock signal, a blast enable signal, and an address enable signal and generate outputs to control the WL driver 110 and the I/O circuitry 120. The chip enable signal indicates whether the memory will be accessed or not. The clock signal indicates the start of an operation for memory and provides the operating frequency for the circuitry. The blast enable signal indicates whether the operation being performed at the memory is in blast mode. The address enable signal supports out-of-order bitcell access. Out-of-order bitcell access refers to the ability to write or read (or otherwise access) bitcells on a non-consecutive basis. That is, by using the address enable signal, which indicates which bitlines are going to be accessed during the blast mode, it is possible to have multiple words read or written to non-consecutive bitcells of a row.

The WL driver 110 receives an address and turns on a wordline indicated by the address in response to receiving a wordline enable (WLEN) signal from the control circuit 140.

The input/output circuitry 120 can include write circuitry and read circuitry. Data (D) is received for write operations and Data (Q) is output for read operations. The input/output circuitry 120 receives a sense amplifier enable (SAE) signal, a precharge (PCH) signal, and a column select (YW/YR) signal from the control circuit 140. In the case of write operations, the control circuit 140 provides a precharge (PCH) signal and a write column select (YW) signal to write circuitry. In the case of read operations, the control circuit 140 provides a sense amplifier enable (SAE) signal, a precharge (PCH) signal, and a read column select (YR) signal to read circuitry.

The control circuit 140 can include circuitry supporting blast operations, including the various configurations described with respect to FIGS. 3A-3C, 4A, 4B, 5, and 6.

Figure 2:
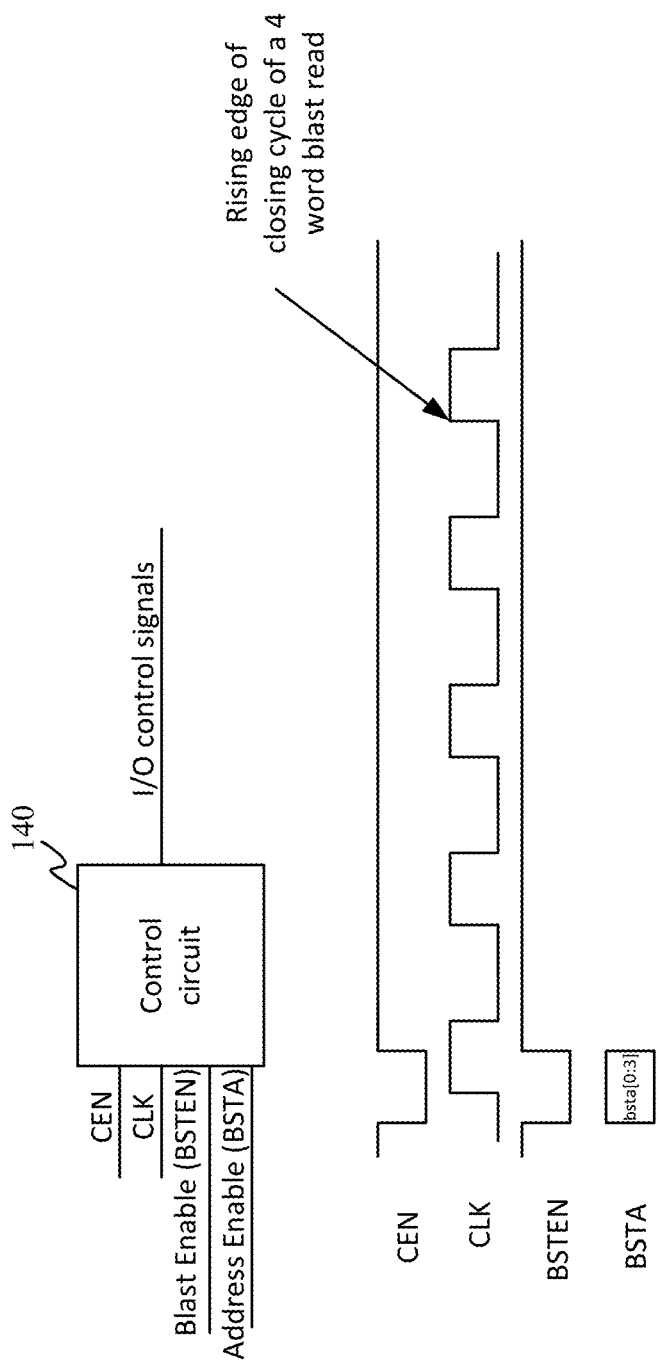
FIG. 2 illustrates control input sequences to a control circuit for supporting blast operations to memory.

FIG. 2 illustrates control input sequences to a control circuit for supporting blast operations to memory. As can be seen, from the timing diagram of FIG. 2, the control circuit receives a chip enable signal, a clock signal, a blast enable signal, and an address enable signal and then must generate control signals (e.g., for reading or writing) supporting a varying number of accesses per operation (as well as supporting out-of-order accesses). Internal control circuitry of the control circuit 140 sequences the control inputs to the memory array in a manner that allows for the memory operation to be performed. In various implementations, the internal control circuitry is designed with an optimization goal of a minimum overhead in terms of area, leakage, and power.

Since a variable depth of blast is supported (e.g., one, two, three, four words, etc.), the number of CLK cycles that the current operation is going to take is not fixed but is dependent upon the values captured on the BSTA inputs at the start of the operation. To assist with blast operations, which allow for increased throughput that not only vary in the numbers of words written/read but also support non-consecutive bitcell accesses, control signals can be generated to specify whether a cycle is a first cycle in the operation (based on the chip enable signal and the clock signal) and for each upcoming cycle in the blast operation, which column is to be accessed. In addition, it can be important to detect the start of the last cycle of a blast operation so that there is sufficient time to perform the operations of the last cycle (and not run through an additional sequence of operations in preparation of an access when not needed).

For example, in a blast mode, it is important to detect the closing cycle of the blast operation, such as the 5th cycle in a blast read with a depth of 4 words. By being able to detect the closing cycle of the blast operation, the internally timed sense-amp precharge signal (which triggers for each word being written) will not be triggered again when no operation is going to be performed. In addition, following from this internally timed sense-amp precharge signal, the local clocking signal gtp should also not trigger again, since all the activity has been performed and the wordline can be closed (in a blast read, the wordline remains active throughout the blast operation, which spans multiple cycles).

Advantageously, by incorporating a last cycle detection circuit as described herein, it is possible to detect the last cycle on the rising CLK edge of the last cycle, which makes the operation independent of the CLK high and CLK low times. Furthermore, the described last cycle detection circuit is able to compute this information sufficiently early so that by the time the current operation closes, control signals have been updated so that a new operation does not start.

It should be understood that while specific reference is made to "blast" operations, the foregoing circuitry is also suitable for other control circuits that receive similar inputs (e.g., a chip enable, a clock, an enable signal for a varying multi-clock operation, and an address enable type signal or bitmask) in which there are varying number of cycles that may be required to perform an operation.

Figure 3A:
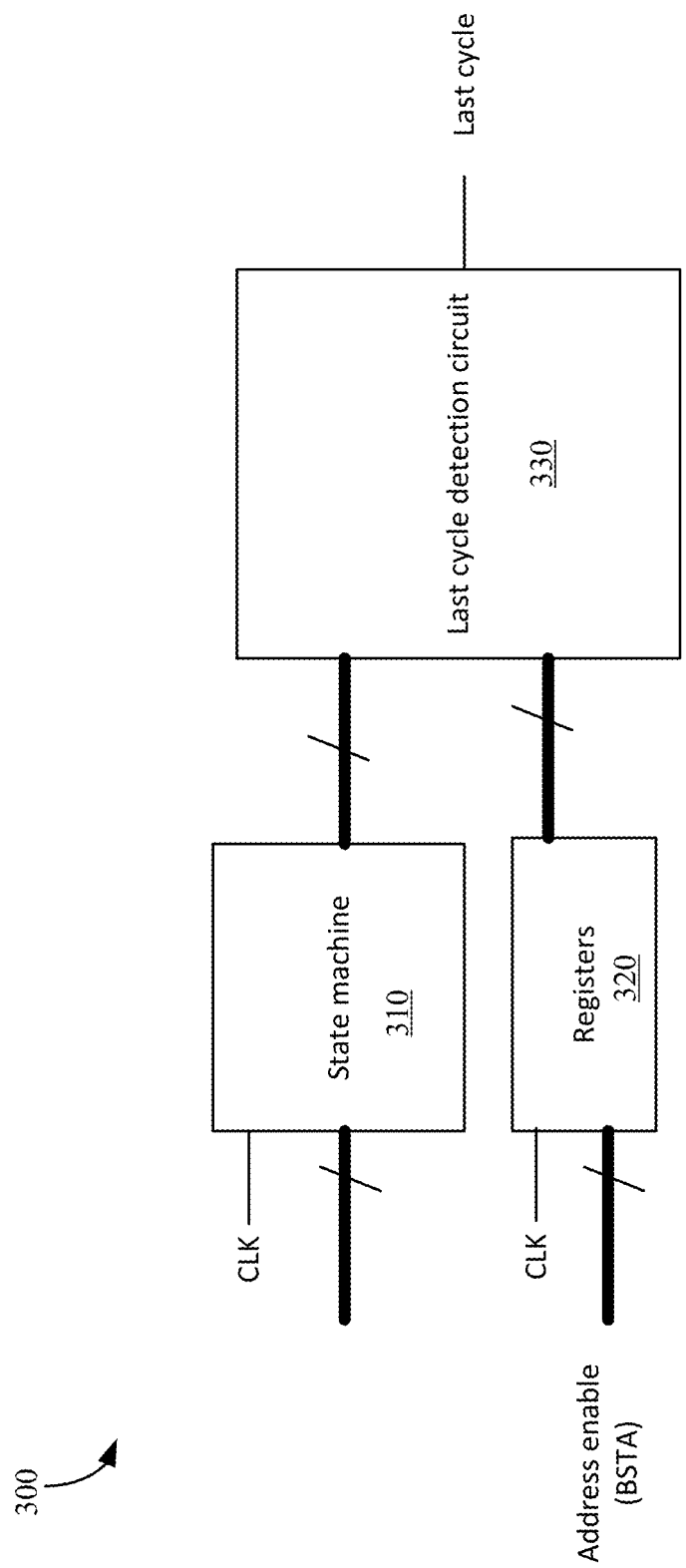
FIG. 3A shows a representative control circuit for detecting a closing cycle of a blast operation.
Figure 3B:
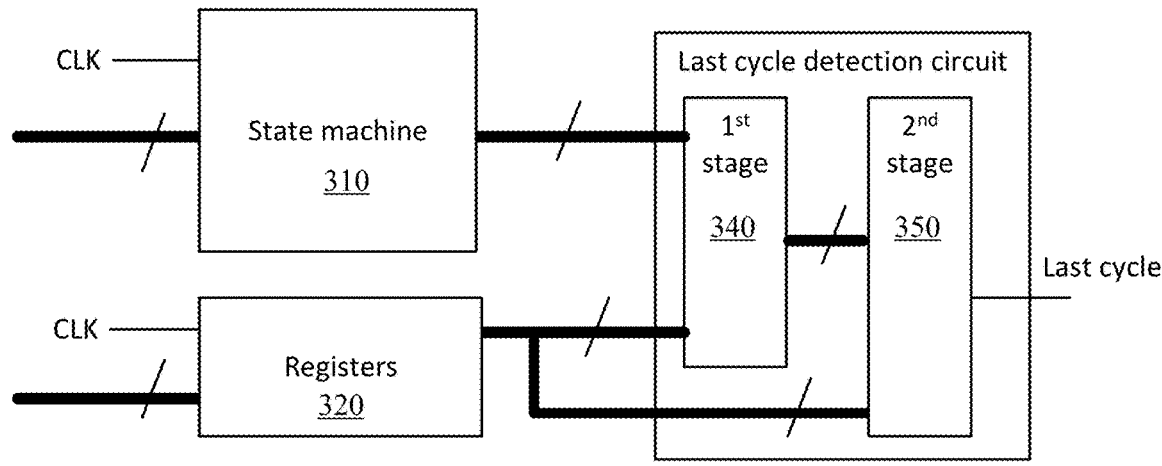
FIG. 3B shows an embodiment of the representative control circuit of FIG. 3A.
Figure 3C:
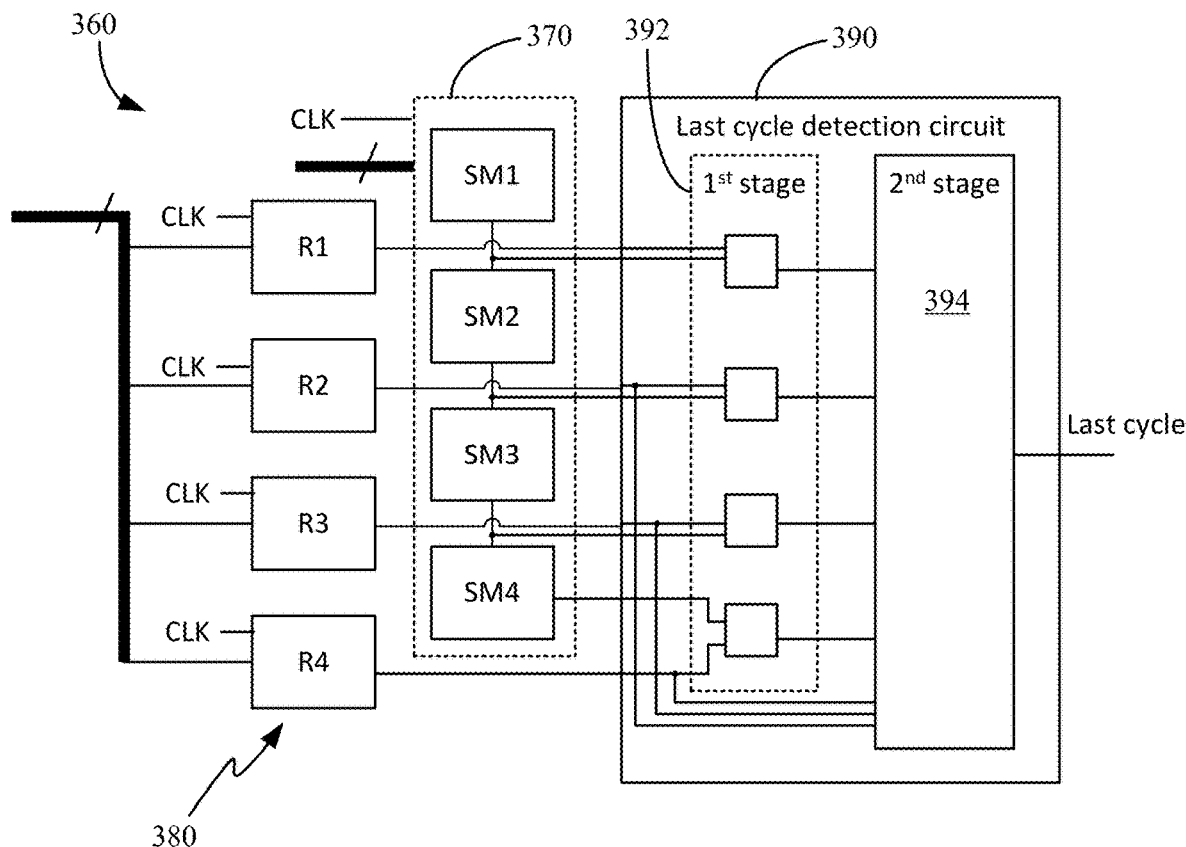
FIG. 3C shows an example implementation of the representative control circuit supporting blast operations for up to four words.

FIG. 3A shows a representative control circuit for detecting a closing cycle of a blast operation; FIG. 3B shows an embodiment of the representative control circuit of FIG. 3A; and FIG. 3C shows an example implementation of the representative control circuit supporting blast operations for up to four words.

Referring to FIG. 3A, control circuit 300, which can be used in control circuit 140 as in FIG. 1, includes a state machine 310, a set of registers 320, and a last cycle detection circuit 330. The state machine 310 includes a number of state elements corresponding to a maximum number of available columns of a blast operation for memory. The state machine is structured to receive a clock (CLK) and an input associated with a start of memory operations and to output intermediate state element outputs and a final state element output. The state machine 310 may be implemented based on the state machine shown in FIG. 6.

The set of registers 320 includes a corresponding register for each state element of the state machine 310 such that the set of registers 320 has a number of registers corresponding to the maximum number of available columns of the blast operation for the memory. Each register of the set of registers 320 is available to store, from an address enable signal (BSTA), a value indicating which column(s) in memory to which that register corresponds is to be accessed. The number of cycles of a multi-cycle operation such as a blast read or write is based on the number of words to be written or read in that multi-cycle operation and can be determined, in part, on how many columns are indicated as needed by the address enable signal.

The last cycle detection circuit 330 is structured to combine outputs of the set of registers with the outputs of the state machine to generate a last cycle signal that goes high on the rising edge of a closing clock of a multi-cycle operation.

The signal output from the last cycle detection circuit 330 can be used by the control circuit 140 described in FIGS. 1 and 2 to a) stop re-triggering of the sense amplifier during blast read operations, b) close the wordline (WL) after blast read or write operations, and c) stop re-triggering of the internally timed clock pulse, as some examples. Indeed, in some cases, control circuit 140 can include circuitry for generating a precharge signal for a sense amplifier that is structured to receive the last cycle signal. In some cases, control circuit 140 can include circuitry for controlling a wordline driver that is structured to receive the last cycle signal. In some cases, control circuit 140 can include circuitry for generating an internal clock pulse that is structured to receive the last cycle signal.

Referring to FIG. 3B, an embodiment of the last cycle detection circuit 330 can include a first stage 340 combining outputs of the set of registers with outputs of the state machine to generate position signals for each register value of the set of registers; and a second stage 350 comprising combinatorial logic receiving the position signals from the first stage and one or more outputs of the set of registers and outputting a last cycle signal, whereby the last cycle signal is output in response to a rising edge of a last clock of a multi-cycle operation.

FIG. 3C illustrates an implementation supporting blast operations of up to four words. Here, a control circuit 360 includes a state machine 370 with four state elements (SM1, SM2, SM3, SM4), a set of registers 380 with four registers (R1, R2, R3, R4), and a last cycle detection circuit 390 with a first stage 392 and a second stage 394. In some cases, last cycle detection circuit 390 is implemented such as described with respect to FIGS. 4A and 4B.

For example, with reference to FIG. 2 and FIGS. 3A and 3B, on the rising edge of CLK when CEN=0, the value of BSTEN (Blast Enable), GWEN (Global Write Enable—which can indicate if the operation is a read or write operation) and BSTA (Blast Address) can be captured into the set of registers 320 inside the memory. In the illustrative embodiment of FIG. 3C (and FIGS. 4A and 4B), state machine 310 can be implemented inside the memory as 4 shift registers with outputs NQF2, NQF3, NQF4 and NQF5, as illustrated with respect to FIG. 6. The outputs of the state machine shift registers trigger on the rising edge of CLK.

The first stage of the last cycle detection circuitry generates outputs FF_BSTA0/1/2/3 by combining the BSTA0/1/2/3 signals with NQF2/3/4/5 respectively. The output FF_BSTA0 goes high if BSTA0=1 and NYR0 was active (i.e., low) in the previous cycle.

Based on these signals, the 'closing' cycle or the 'last' cycle can be determined as follows.

This cycle is the last cycle if any one of the following conditions is true:
FF_BSTA3=1
FF_BSTA2=1 && !BSTA3
FF_BSTA1=1 && !BSTA3&!BSTA2
FF_BSTA0=1 && !BSTA3&!BSTA2&!BSTA1

Based on the above, it can be seen that a last cycle detection circuit 330, 390 can use information of which available column contains a value (e.g., as indicated by the set of registers) and which cycle is being activated (e.g., as indicated by the state machine) as part of a first stage and then checking against whether there are remaining columns to select (e.g., as indicated by the set of registers) as part of a second stage. That is, the last cycle detection circuit 330, 390 can include a first stage combining outputs of the set of registers (nbsta0-3) with outputs of the state machine (nqf2-5) to generate position signals (ff_bsta0-3) for each register value of the set of registers; and a second stage comprising logic structured to receive position signals (ff_bsta0-3) from the first stage and outputs of the set of registers (such as ibsta2,3 and nbsta1,3) and output a last cycle signal (last_cycle) at a beginning of the last cycle.

In the first stage, an output of a first register corresponding to a first column position and an intermediate output of a first state machine element are combined to a first position signal; an output of a second register corresponding to a second column position and an intermediate output of a second state machine element are combined to a second position signal; an output of a third register corresponding to a third column position and an intermediate output of a third state machine element are combined to a third position signal; and an output of a fourth register corresponding to a fourth column position and the final output of a fourth state machine element are combined to a fourth position signal.

Figure 4A:
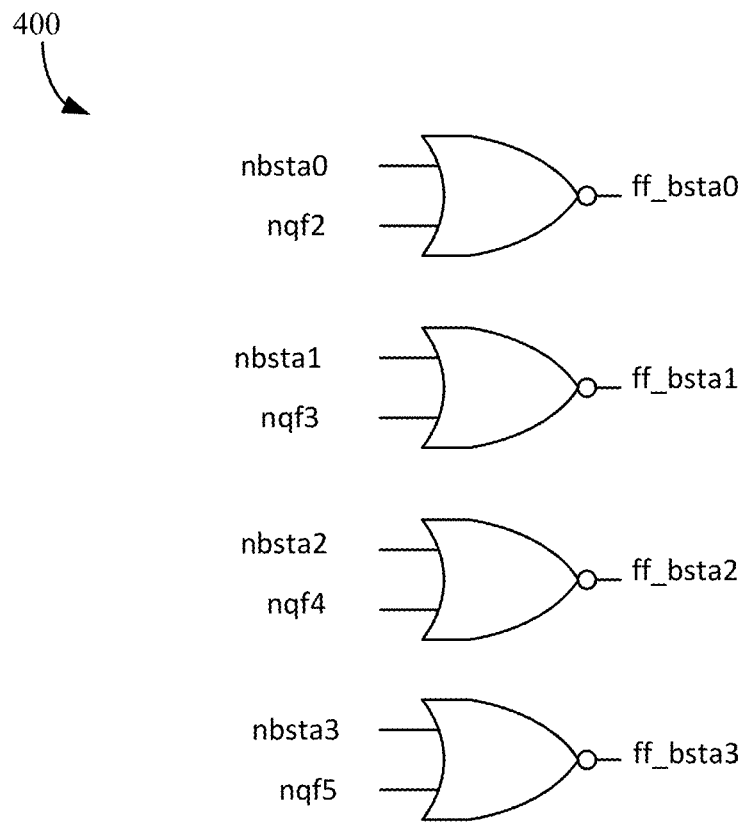
FIG. 4A illustrates an example first stage of a last cycle detection circuit.

FIG. 4A illustrates an example first stage of a last cycle detection circuit. Referring to FIG. 4A, the first stage 400 includes a first NOR gate structured to receive the output of a first register corresponding to the first column position (nbsta0) and the intermediate output of the first state machine element (nqf2) and output the first position signal (ff_bsta0); a second NOR gate structured to receive the output of the second register corresponding to the second column position (nbsta1) and the intermediate output of the second state machine element (nqf3) and output the second position signal (ff_bsta1); a third NOR gate structured to receive the output of the third register corresponding to the third column position (nbsta2) and the intermediate output of the third state machine element (nqf4) and output the third position signal (ff_bsta2); and a fourth NOR gate structured to receive the output of the fourth register corresponding to the fourth column position (nbsta3) and the final output of the fourth state machine element (nqf5) and output the fourth position signal (ff_bsta3).

In the second stage, a first cycle is determined to be a last cycle if the first position signal is high and the outputs of the second register, the third register, and the fourth register are not high; a second cycle is determined to be the last cycle if the second position signal is high and the outputs of the third register and the fourth register are not high; a third cycle is determined to be the last cycle if the third position signal is high and the output of the fourth register is not high; and a fourth cycle is determined to be the last cycle if the fourth position signal is high.

Figure 4B:
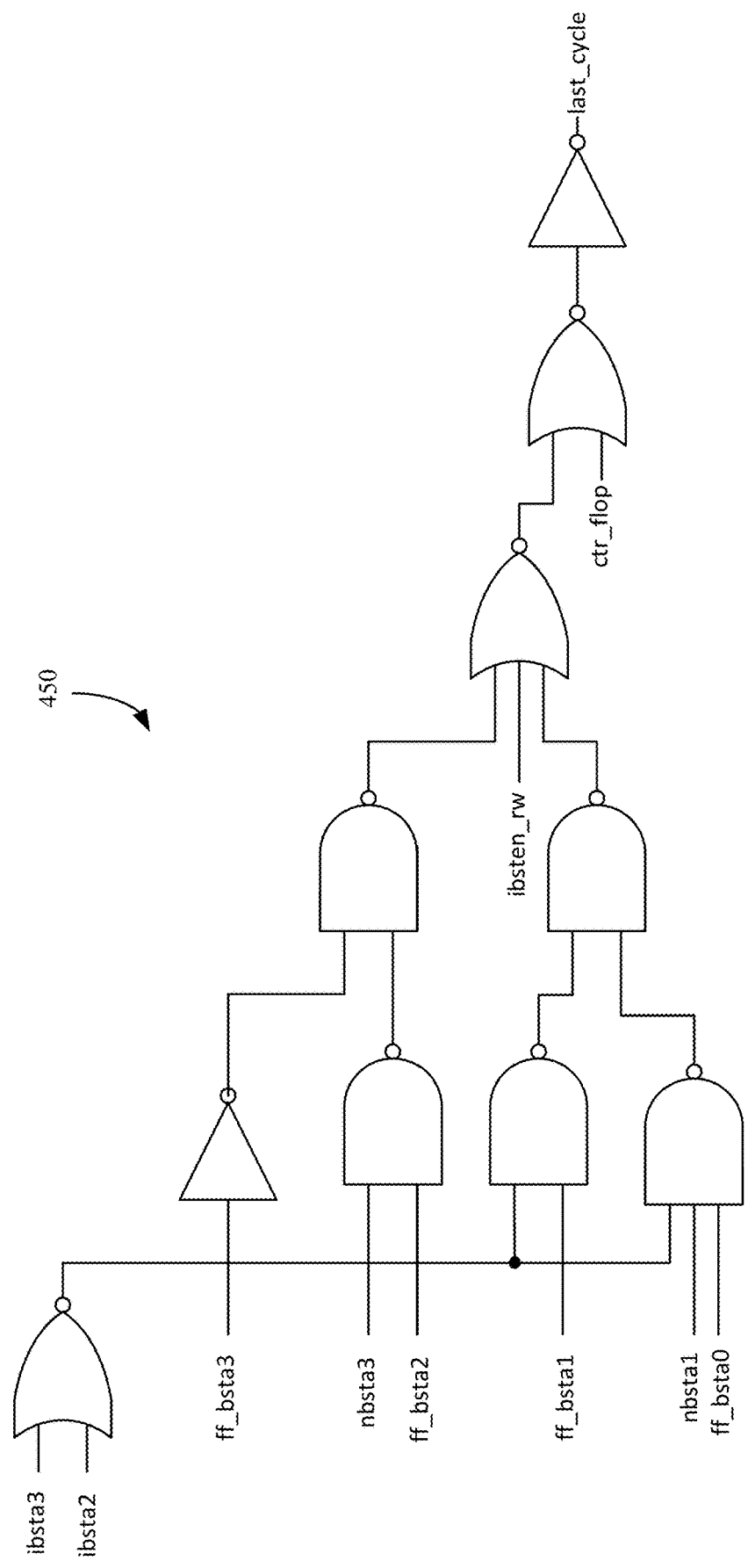
FIG. 4B illustrates an example second stage of a last cycle detection circuit.

FIG. 4B illustrates an example second stage of a last cycle detection circuit. Referring to FIG. 4B, a second stage 450 can include a first NOR gate receiving the outputs of the third register (ibsta2) and the fourth register (ibsta3); a first inverter receiving the fourth position signal (ff_bsta3); a first NAND gate receiving an inverted output of the fourth register (nbsta3) and the third position signal (ff_bsta2); a second NAND gate receiving an output of the first NOR gate and the second position signal (ff_bsta1); a third NAND gate receiving the output of the first NOR gate, an inverted output of the second register (nbsta1), and the first position signal (ff_bsta0); a fourth NAND gate receiving an output of the first inverter and an output of the first NAND gate; a fifth NAND gate receiving an output of the second NAND gate and an output of the third NAND gate; a second NOR gate receiving an output of the fourth NAND gate and an output of the fifth NAND gate; a third NOR gate receiving an output of the second NOR gate and a reset signal (ctr_flop) that goes high in a first clock of the multi-cycle operation; and a second inverter that receives an output of the third NOR gate and outputs the last cycle signal (last_cycle).

In some cases, the second NOR gate further receives a mode signal (ibsten_rw) that allows the output of the second NOR gate to be clamped for a non-multi-cycle operation.

As shown in the example circuit of FIG. 4B, to reset the last cycle detection circuit before the start of any operation, an internal control signal called ctr_flop is added as part of the circuit (e.g., as input to the third NOR gate). The control signal ctr_flop is characterized as a control signal that goes high in the 1$^{st}$ CLK cycle (triggered by CLK rise). The control signal ctr_flop is mixed into last_cycle as the highest priority signal, so that if this is the 1$^{st}$ CLK cycle (i.e., CEN=0 is captured), then, last_cycle will always be high, allowing the operation to begin.

Figure 5:
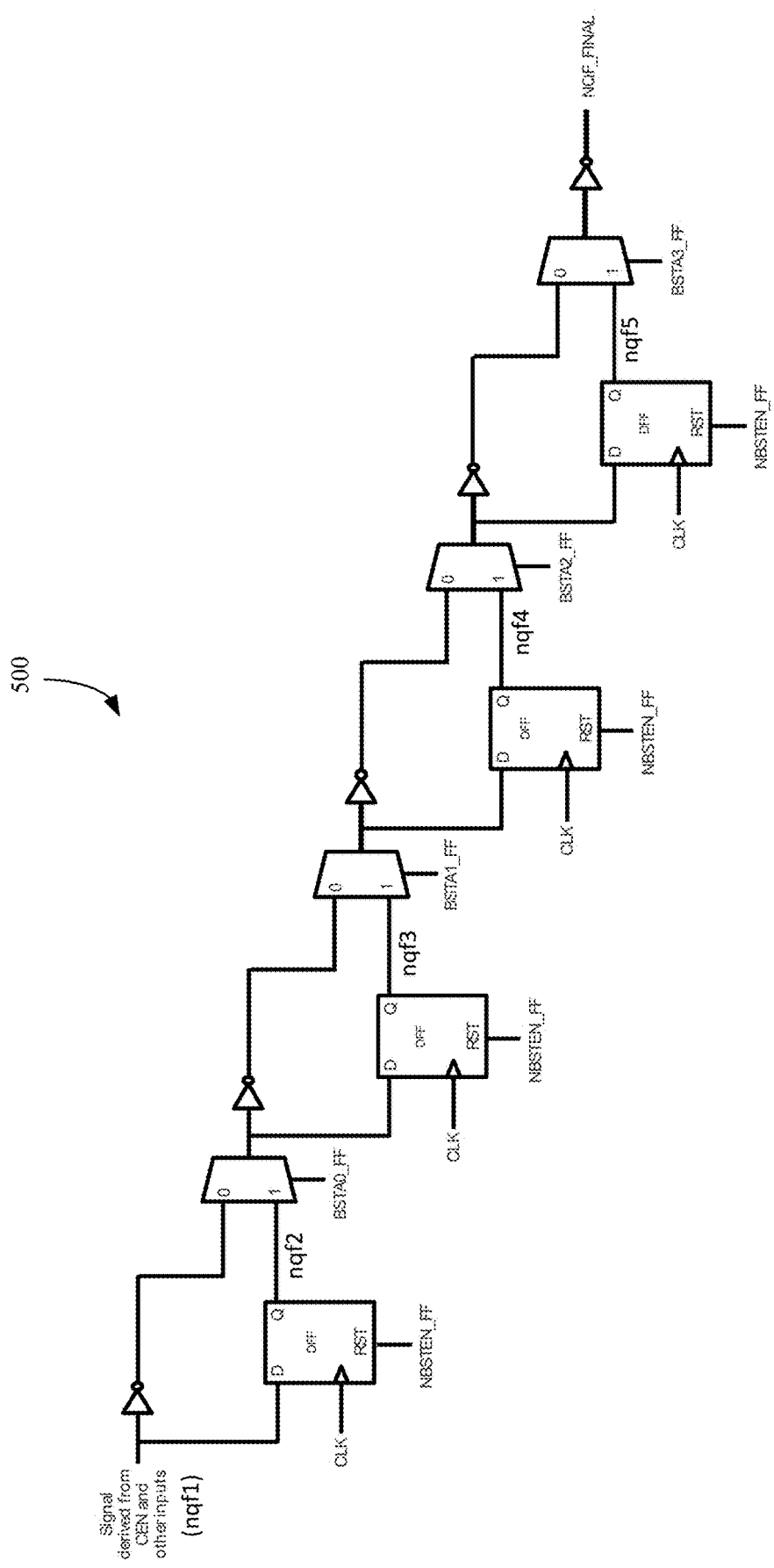
FIG. 5 shows a simplified state machine diagram.

FIG. 5 shows a simplified state machine diagram. In FIG. 5, a simple representation of a state machine 500 is shown that can be implemented in the control circuit for a memory such as described with respect to FIGS. 1, 2, 3A-3C, 4A and 4B. The signals output by state machine 500 (i.e., nqf2, nqf3, nqf4, nqf5) can be used by the circuit shown in FIG. 4A. Referring to FIG. 5, the state machine 500 includes four state elements using four shift registers and four multiplexers, each multiplexer disposed between stages of the state machine. The blast enable signal (BSTEN) can be used to reset the shift registers (e.g., based on a value captured into a flip-flop—not shown). The value on the address select signal (e.g., BSTA [3:0]) can also be captured into flip-flops (not shown) in a first clock cycle. The values captured into the flip-flops are output as BSTA0_FF, BSTA1_FF, BSTA2_FF, and BSTA3_FF and used to control the four multiplexes located between the states of the state machine. For any multiplexer, if the control line is '1', then there is a delay of 1 clock cycle before the output updates. If the control line is '0', then the output updates in the same clock cycle. Therefore, if BSTA=1001, then NQF_FINAL toggles in 2 cycles (since there are 2 ones in the BSTA); and if BSTA=1111, then NQF_FINAL toggles in 4 cycles (since there are 4 ones in the BSTA).

As mentioned above, the last_cycle signal generated by the last cycle detection circuit can be used by the control circuit 140 to know when to stop certain operations. For example, the internal clock pulse generator that generates a gtp_pre signal used in the internal circuitry of the control circuit for precharging operations (e.g., for bitline precharge and/or sense amp precharge for read operations) is controlled by two inputs:

1. A clock edge, clks1—
   a. This is the external CLK edge for the 1$^{st}$ CLK cycle (CEN=0)
   b. This is the falling edge of gtp_sa for subsequent CLK cycles.
2. A control input, ctrs1—if this input is 0, CLK edges are ignored. If this input is 1, CLK edge triggers a gtp_pre pulse. This signal is generated by:
   a. CEN directly, in case the memory is not currently doing an operation.
   b. A mixture of a latched version of sae_clk and last_cycle.
      i. In blast memory operation, the rising edge of sae_clk turns ctrs1 high, and the rising edge of last_cycle turns ctrs1 low.

To ensure a robust operation of the clock generator, a CLKGENLAT block can be included on both ctr signals— i.e., one generated by CEN and one generated by the ctrs1 signal.

As another example, the last_cycle signal can be used control operation of a wordline so that the wordline can be maintained on until the last cycle. As an illustrative example, for the blast read operation, control circuit 140 can direct the wordline driver 110 shown in FIG. 1 to maintain the single selected wordline as on until the n+1 clock cycle. In some cases, the control circuit 140 turns off the single selected wordline during a falling edge of the n+1 clock cycle. That is, the wordline generated in the first cycle is made to continue to remain high until the last cycle of a blast read operation. This ensures that the bitline differential is created continuously on all columns that may be read out.

Figure 6:
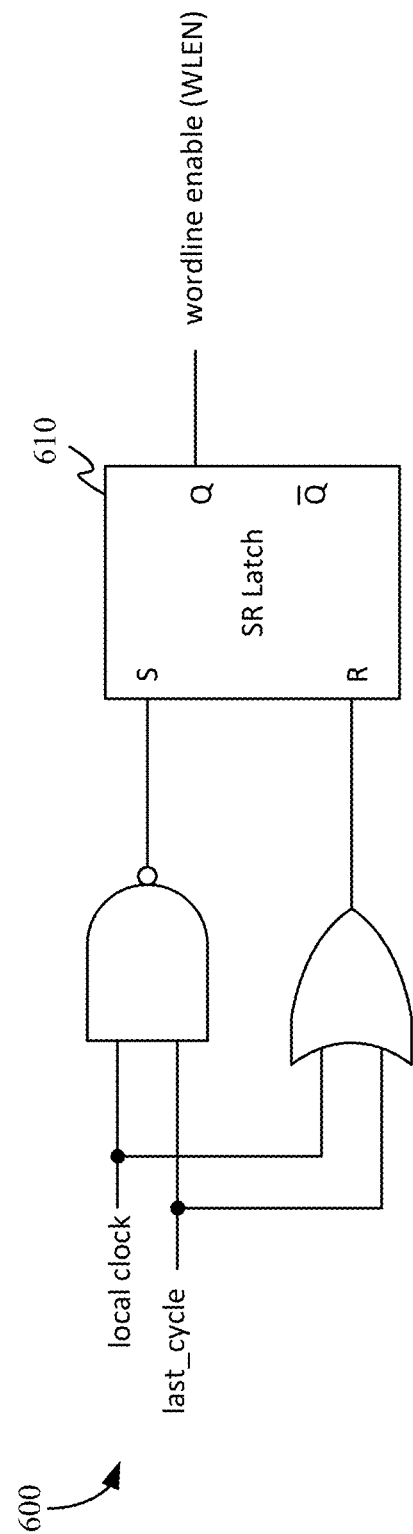
FIG. 6 shows a control circuit for generating a wordline enable signal.

FIG. 6 shows a control circuit for generating a wordline enable signal. A control circuit for generating a wordline enable signal can include a latch 610 that is structured to go high during a first clock cycle to output a wordline enable signal that directs the wordline driver to turn on the single selected wordline and is further structured to receive a last cycle signal that resets the wordline enable signal such that the wordline driver closes the single selected wordline in response to the last cycle signal indicating the last (e.g., n+1) clock cycle. Here, a local clock signal and the last cycle signal (last_cycle) are combined for use as SET and RESET inputs to the latch 610. A NAND gate can be used to keep the input high so long as the last_cycle remains low (i.e., that it is not yet the last cycle). An OR gate (or equivalent such as a NOR with an inverter) is used to permit a change of the SET value to be stored in the latch 610. That is, when the last_cycle is high, the RESET input is high and the latch 610 will update with the value at the SET input, which is low due to the last_cycle being high. In this manner, the local clock will not cause the wordline enable signal to go low until the last cycle of a blast operation is occurring. Indeed, the circuit 600 triggers a wordline off the first clock and closes the wordline off the last clock in the blast operation, which may vary depending on the depth of the blast read operation.

As can be seen, the last_cycle signal can be used to assist with a variety of control operations.

Certain embodiments of the illustrated methods and memory circuitry include the following.

Clause 1. A control circuit comprising: a state machine comprising a number of state elements corresponding to a maximum number of available columns of a blast operation for memory, wherein the state machine is structured to receive a clock and an input associated with a start of memory operations and to output intermediate state element outputs and a final state element output; a set of registers comprising a corresponding register for each state element such that the set of registers has a number of registers corresponding to the maximum number of available columns of the blast operation for the memory, wherein each register of the set of registers is available to store, from an address enable signal, a value indicating that a column in memory to which that register corresponds is to be accessed; and a last cycle detection circuit structured to combine outputs of the set of registers with the outputs of the state machine to generate a last cycle signal that goes high on a rising edge of a closing clock of a multi-cycle operation.

Clause 2. The control circuit of clause 1, wherein the last cycle detection circuit comprises: a first stage combining outputs of the set of registers with outputs of the state machine to generate position signals for each register value of the set of registers; and a second stage comprising combinatorial logic receiving the position signals from the first stage and one or more outputs of the set of registers and outputting a last cycle signal, whereby the last cycle signal is output in response to a rising edge of a last clock of a multi-cycle operation.

Clause 3. The control circuit of clause 1 or 2, wherein, in the first stage: an output of a first register corresponding to a first column position and an intermediate output of a first state machine element are combined to a first position signal; an output of a second register corresponding to a second column position and an intermediate output of a second state machine element are combined to a second position signal; an output of a third register corresponding to a third column position and an intermediate output of a third state machine element are combined to a third position signal; and an output of a fourth register corresponding to a fourth column position and a final output of a fourth state machine element are combined to a fourth position signal.

Clause 4. The control circuit of any preceding clause, wherein the first stage comprises: a first NOR gate structured to receive the output of a first register corresponding to the first column position and the intermediate output of the first state machine element and output the first position signal; a second NOR gate structured to receive the output of the second register corresponding to the second column position and the intermediate output of the second state machine element and output the second position signal; a third NOR gate structured to receive the output of the third register corresponding to the third column position and the intermediate output of the third state machine element and output the third position signal; and a fourth NOR gate structured to receive the output of the fourth register corresponding to the fourth column position and the final output of the fourth state machine element and output the fourth position signal.

Clause 5. The control circuit of any preceding clause, wherein, in the second stage: a first cycle is determined to be a last cycle if the first position signal is high and the outputs of the second register, the third register, and the fourth register are not high; a second cycle is determined to be the last cycle if the second position signal is high and the outputs of the third register and the fourth register are not high; a third cycle is determined to be the last cycle if the third position signal is high and the output of the fourth register is not high; and a fourth cycle is determined to be the last cycle if the fourth position signal is high.

Clause 6. The control circuit of any preceding clause, wherein the second stage comprises: a first NOR gate receiving the outputs of the third register and the fourth register; a first inverter receiving the fourth position signal; a first NAND gate receiving an inverted output of the fourth register and the third position signal; a second NAND gate receiving an output of the first NOR gate and the second position signal; a third NAND gate receiving the output of the first NOR gate, an inverted output of the second register, and the first position signal; a fourth NAND gate receiving an output of the first inverter and an output of the first NAND gate; a fifth NAND gate receiving an output of the second NAND gate and an output of the third NAND gate; a second NOR gate receiving an output of the fourth NAND gate and an output of the fifth NAND gate; a third NOR gate receiving an output of the second NOR gate and a reset signal that goes high in a first clock of the multi-cycle operation; and a second inverter that receives an output of the third NOR gate and outputs the last cycle signal.

Clause 7. The control circuit of clause 6, wherein the second NOR gate further receives a mode signal that allows the output of the second NOR gate to be clamped for a non-multi-cycle operation.

Clause 8. The control circuit of any preceding clause, further comprising circuitry for generating a precharge signal for a sense amplifier that is structured to receive the last cycle signal.

Clause 9. The control circuit of any preceding clause, further comprising circuitry for controlling a wordline driver that is structured to receive the last cycle signal.

Clause 10. The control circuit of any preceding clause, further comprising circuitry for generating an internal clock pulse that is structured to receive the last cycle signal.

Clause 11. A memory circuitry, comprising: a wordline driver for a memory, the wordline driver coupled to receive an address and select a corresponding wordline for the memory; input/output circuitry comprising read circuitry and write circuitry; and a control circuit of any preceding clause, the control circuit operating the wordline driver and the input/output circuitry.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A control circuit comprising:
   a state machine comprising a number of state elements corresponding to a maximum number of available columns of a blast operation for memory, wherein the state machine is structured to receive a clock and an input associated with a start of memory operations and to output intermediate state element outputs and a final state element output;
   a set of registers comprising a corresponding register for each state element such that the set of registers has a number of registers corresponding to the maximum number of available columns of the blast operation for the memory, wherein each register of the set of registers is available to store, from an address enable signal, a value indicating that a column in memory to which that register corresponds is to be accessed; and
   a last cycle detection circuit structured to combine outputs of the set of registers with the outputs of the state machine to generate a last cycle signal that goes high on a rising edge of a closing clock of a multi-cycle operation.

2. The control circuit of claim 1, wherein the last cycle detection circuit comprises:
   a first stage combining outputs of the set of registers with outputs of the state machine to generate position signals for each register value of the set of registers; and
   a second stage comprising combinatorial logic receiving the position signals from the first stage and one or more outputs of the set of registers and outputting a last cycle signal, whereby the last cycle signal is output in response to a rising edge of a last clock of a multi-cycle operation.

3. The control circuit of claim 2, wherein, in the first stage:
   an output of a first register corresponding to a first column position and an intermediate output of a first state machine element are combined to a first position signal;

an output of a second register corresponding to a second column position and an intermediate output of a second state machine element are combined to a second position signal;

an output of a third register corresponding to a third column position and an intermediate output of a third state machine element are combined to a third position signal; and an output of a fourth register corresponding to a fourth column position and a final output of a fourth state machine element are combined to a fourth position signal.

4. The control circuit of claim 3, wherein the first stage comprises:
   a first NOR gate structured to receive the output of a first register corresponding to the first column position and the intermediate output of the first state machine element and output the first position signal;
   a second NOR gate structured to receive the output of the second register corresponding to the second column position and the intermediate output of the second state machine element and output the second position signal;
   a third NOR gate structured to receive the output of the third register corresponding to the third column position and the intermediate output of the third state machine element and output the third position signal; and
   a fourth NOR gate structured to receive the output of the fourth register corresponding to the fourth column position and the final output of the fourth state machine element and output the fourth position signal.

5. The control circuit of claim 3, wherein, in the second stage:
   a first cycle is determined to be a last cycle if the first position signal is high and the outputs of the second register, the third register, and the fourth register are not high;
   a second cycle is determined to be the last cycle if the second position signal is high and the outputs of the third register and the fourth register are not high;
   a third cycle is determined to be the last cycle if the third position signal is high and the output of the fourth register is not high; and
   a fourth cycle is determined to be the last cycle if the fourth position signal is high.

6. The control circuit of claim 5, wherein the second stage comprises:
   a first NOR gate receiving the outputs of the third register and the fourth register;
   a first inverter receiving the fourth position signal;
   a first NAND gate receiving an inverted output of the fourth register and the third position signal;
   a second NAND gate receiving an output of the first NOR gate and the second position signal;
   a third NAND gate receiving the output of the first NOR gate, an inverted output of the second register, and the first position signal;
   a fourth NAND gate receiving an output of the first inverter and an output of the first NAND gate;
   a fifth NAND gate receiving an output of the second NAND gate and an output of the third NAND gate;
   a second NOR gate receiving an output of the fourth NAND gate and an output of the fifth NAND gate;
   a third NOR gate receiving an output of the second NOR gate and a reset signal that goes high in a first clock of the multi-cycle operation; and
   a second inverter that receives an output of the third NOR gate and outputs the last cycle signal.

7. The control circuit of claim 6, wherein the second NOR gate further receives a mode signal that allows the output of the second NOR gate to be clamped for a non-multi-cycle operation.

8. The control circuit of claim 1, further comprising circuitry for generating a precharge signal for a sense amplifier that is structured to receive the last cycle signal.

9. The control circuit of claim 1, further comprising circuitry for controlling a wordline driver that is structured to receive the last cycle signal.

10. The control circuit of claim 1, further comprising circuitry for generating an internal clock pulse that is structured to receive the last cycle signal.

11. A memory circuitry, comprising:
    a wordline driver for a memory, the wordline driver coupled to receive an address and select a corresponding wordline for the memory;
    input/output circuitry comprising read circuitry and write circuitry; and
    a control circuit for operating the wordline driver and the input/output circuitry, wherein the control circuit comprises:
      a state machine comprising a number of state elements corresponding to a maximum number of available columns of a blast operation for memory, wherein the state machine is structured to receive a clock and an input associated with a start of memory operations and to output intermediate state element outputs and a final state element output;
      a set of registers comprising a corresponding register for each state element such that the set of registers has a number of registers corresponding to the maximum number of available columns of the blast operation for the memory, wherein each register of the set of registers is available to store, from an address enable signal, a value indicating that a column in memory to which that register corresponds is to be accessed; and
      a last cycle detection circuit structured to combine outputs of the set of registers with the outputs of the state machine to generate a last cycle signal that goes high on a rising edge of a closing clock of a multi-cycle operation.

12. The memory circuitry of claim 11, wherein the last cycle detection circuit comprises:
    a first stage combining outputs of the set of registers with outputs of the state machine to generate position signals for each register value of the set of registers; and
    a second stage comprising combinatorial logic receiving the position signals from the first stage and one or more outputs of the set of registers and outputting a last cycle signal, whereby the last cycle signal is output in response to a rising edge of a last clock of a multi-cycle operation.

13. The memory circuitry of claim 12, wherein, in the first stage:
    an output of a first register corresponding to a first column position and an intermediate output of a first state machine element are combined to a first position signal;
    an output of a second register corresponding to a second column position and an intermediate output of a second state machine element are combined to a second position signal;

an output of a third register corresponding to a third column position and an intermediate output of a third state machine element are combined to a third position signal; and an output of a fourth register corresponding to a fourth column position and a final output of a fourth state machine element are combined to a fourth position signal.

14. The memory circuitry of claim 13, wherein the first stage comprises:
a first NOR gate structured to receive the output of a first register corresponding to the first column position and the intermediate output of the first state machine element and output the first position signal;
a second NOR gate structured to receive the output of the second register corresponding to the second column position and the intermediate output of the second state machine element and output the second position signal;
a third NOR gate structured to receive the output of the third register corresponding to the third column position and the intermediate output of the third state machine element and output the third position signal; and
a fourth NOR gate structured to receive the output of the fourth register corresponding to the fourth column position and the final output of the fourth state machine element and output the fourth position signal.

15. The memory circuitry of claim 13, wherein, in the second stage:
a first cycle is determined to be a last cycle if the first position signal is high and the outputs of the second register, the third register, and the fourth register are not high;
a second cycle is determined to be the last cycle if the second position signal is high and the outputs of the third register and the fourth register are not high;
a third cycle is determined to be the last cycle if the third position signal is high and the output of the fourth register is not high; and a fourth cycle is determined to be the last cycle if the fourth position signal is high.

16. The memory circuitry of claim 15, wherein the second stage comprises:
a first NOR gate receiving the outputs of the third register and the fourth register;
a first inverter receiving the fourth position signal;
a first NAND gate receiving an inverted output of the fourth register and the third position signal;
a second NAND gate receiving an output of the first NOR gate and the second position signal;
a third NAND gate receiving the output of the first NOR gate, an inverted output of the second register, and the first position signal;
a fourth NAND gate receiving an output of the first inverter and an output of the first NAND gate;
a fifth NAND gate receiving an output of the second NAND gate and an output of the third NAND gate;
a second NOR gate receiving an output of the fourth NAND gate and an output of the fifth NAND gate;
a third NOR gate receiving an output of the second NOR gate and a reset signal that goes high in a first clock of the multi-cycle operation; and
a second inverter that receives an output of the third NOR gate and outputs the last cycle signal.

17. The memory circuitry of claim 16, wherein the second NOR gate further receives a mode signal that allows the output of the second NOR gate to be clamped for a non-multi-cycle operation.

18. The memory circuitry of claim 11, wherein the control circuit further comprises circuitry for generating a precharge signal for a sense amplifier of the read circuitry that is structured to receive the last cycle signal.

19. The memory circuitry of claim 11, wherein the control circuit further comprises circuitry for controlling the wordline driver that is structured to receive the last cycle signal.

20. The memory circuitry of claim 11, wherein the control circuit further comprises circuitry for generating an internal clock pulse that is structured to receive the last cycle signal.

* * * * *